United States Patent

Teglovic et al.

[11] Patent Number: 5,898,765
[45] Date of Patent: Apr. 27, 1999

[54] SYSTEM AND METHOD FOR REAL-TIME EXCHANGE OF CUSTOMER DATA BETWEEN TELECOMMUNICATIONS COMPANIES (QUICK PIC)

[75] Inventors: Eugene W. Teglovic; John B. Hedges; Douglas L. Wekamp; Theresa R. Jahelka; J. Wilbur Wayne Whitney, III; Winston Lee Davis, Jr.; Valerie J. Prothe, all of Colorado Springs, Colo.

[73] Assignee: MCI Communications Corporation, Del.

[21] Appl. No.: 08/923,872

[22] Filed: Sep. 2, 1997

[51] Int. Cl.$^6$ .................................................. H04M 15/00
[52] U.S. Cl. .......................... 379/120; 379/207; 379/221; 379/229
[58] Field of Search .................................... 379/111, 112, 379/114, 115, 116, 119, 120, 121, 133, 134, 207, 219, 220, 221, 229, 230

[56] References Cited

U.S. PATENT DOCUMENTS

| | | | |
|---|---|---|---|
| 5,555,290 | 9/1996 | McLeod et al. | 379/207 |
| 5,680,552 | 10/1997 | Netravali et al. | 379/220 |
| 5,748,717 | 5/1998 | Chan et al. | 379/207 |
| 5,781,620 | 7/1998 | Montgomery et al. | 379/229 |

*Primary Examiner*—Paul Loomis

[57] ABSTRACT

A system and method for real-time exchange of customer information between telecommunications companies provides a significant reduction in the time required for completing a preferred inter-exchange carrier (PIC) order. It also provides significant reductions in the time required for other applications of customer information exchange, such as messages from a local exchange carrier (LEC) to an inter-exchange carrier (IEC) and customer inquiries. The present invention is an application of systems, and is referred to as Quick PIC. Quick PIC utilizes a telecommunications gateway that transmits a Customer Account Record Exchange (CARE) record, which format is defined by the ANSI T1.246 standard, using an OSI protocol stack that includes Common Management Information Protocol (CMIP) for the application layer. A CARE record can contain a PIC order, customer information inquiry, or customer information.

18 Claims, 7 Drawing Sheets

Standardized OSI Protocols

| Name | Layer | Protocols |
|---|---|---|
| 7 | Application | CMISE (ISO 9595/CCITT X.710), CMIP (ISO 9596-1/CCITT X.711, ISO 9596-2/CCITT X.712 ACSE (ISO 8649/CCITT X.217, ISO 8650/CCITT X.227) ROSE (ISO 9072-1/CCITT X.219, ISO 9072-2/CCITT X.229) |
| 6 | Presentation | ISO 8822/CCITT X.216, ISO 8823/CCITT X.226, ASN.1 (ISO 8824/CCITT X.208), BER (ISO) 8825/CCITT X.209) |
| 5 | Session | ISO 8326/CCITT X.215, ISO 8327/CCITT X.225 |
| 4 | Transport | ISO 8072/CCITT X.214, ISO 8073/CCITT X.224 |
| 3 | Network | ISO 8028, 8878 CCITT X.213, X.223, X.244, X.25 |
| 2 | Data Link | ISO 7776 |
| 1 | Physical | CCITT V.35, V.28, V.24 |

FIG. 3

GLOSSARY OF ABBREVIATIONS

| | |
|---|---|
| ATIS | Alliance for Telecommunications Industry Solutions |
| BTN | Billing Telephone Number |
| CARE | Customer Account Record Exchange |
| CIC | Carrier Identification Code |
| CMIP | Common Management Information Protocol |
| IEC | Inter-Exchange Carrier |
| LEC | Local Exchange Carrier |
| MOI | Managed Object Instance |
| NDM | Network Data Mover |
| NEWS | NLIS Enhanced Workstation |
| NLIS | National LEC Interface System |
| PIC | Preferred Inter-Exchange Carrier |
| WTN | Working Telephone Number |

FIG. 7

SYSTEM AND METHOD FOR REAL-TIME EXCHANGE OF CUSTOMER DATA BETWEEN TELECOMMUNICATIONS COMPANIES (QUICK PIC)

RELATED APPLICATIONS

The present application relates to U.S. patent application Ser. No. 08/560,550, filed Nov. 17, 1995, entitled "Registry Communications Middleware", and U.S. patent application Ser. No. 08/454,732, filed May 31, 1995, and entitled "Electronic Interface for Exchange of Trouble Administration Information in Telecommunications".

FIELD OF THE INVENTION

The present invention relates to data exchange between telephone carriers and, more particularly, to such exchanges between a Local Exchange Carrier (LEC) and an Inter-Exchange Carrier (IEC).

BACKGROUND OF THE INVENTION

In the telecommunications industry, a Local Exchange Carrier (LEC) is used to originate a customer's telephone call. An Inter-Exchange Carrier (IEC) provides long distance service for customers. The customer selects a Preferred Inter-Exchange Carrier (PIC) when ordering service from the LEC. The LEC enters a code for the selected PIC in its class 5 or class 4/5 switch that serves the customer. The PIC code is assigned to the switch port that supports the customer's access line. When the customer makes a long distance call by dialing 1, the LEC switch automatically routes the call to the PIC.

Obviously, being selected as the PIC for customers is very important to an IEC. When an IEC signs up a new customer for long distance service, it sends a PIC order to that customer's LEC. This is a request for the LEC to change the customer's PIC code assignment in the LEC switch, so that the customer's dial 1 long distance calls are automatically routed to that IEC.

The problem with this PIC order process is that it requires up to three days to complete. In today's competitive environment, this is much too long, resulting in lost revenue for the IEC and customer dissatisfaction. From the time the new customer's order is entered into the Order Entry System, until the time the LEC Switch is updated, every dial 1 long distance call made by the customer is routed to the old IEC, previously designated as the PIC. This represents lost revenue for the new IEC, newly selected by the customer for the PIC. It also presents potential for customer dissatisfaction, since the customer is not able to use their newly selected PIC for their dial 1 long distance calls. A significant improvement in the PIC order process is needed to address these problems.

PIC orders are one example of the type of customer information exchange that occurs among telecommunications companies. Other applications suffer from the delays encountered with prior art methods of customer information exchange. For example, FYI's refer to messages sent by a LEC to an IEC, when the PIC for that IEC's customer has changed to a new IEC. It is important for the old IEC to know this immediately, so that they can follow up with the customer to determine why the customer has selected a new PIC. For another example, it is common for an IEC to send inquiries to a LEC for customer information, such as addresses or selected services. These applications would also benefit from an improvement in the method of customer information exchange among telecommunications companies.

BRIEF DESCRIPTION OF THE PRESENT INVENTION

The present system and method for real-time exchange of customer information between telecommunications companies provides a significant reduction in the time required for completing a PIC order. It also provides significant reductions in the time required for other applications of customer information exchange, such as FYI's and customer inquiries. In practice, a PIC order, which previously required 1 to 2 days to send to a LEC and be completed, can be completed in 3 to 10 seconds.

The present invention is an application of systems, and is referred to as Quick PIC. Quick PIC utilizes a telecommunications gateway that transmits a Customer Account Record Exchange (CARE) record, which format is defined by the ANSI T1.246 standard. This is an industry standard identified as the Alliance for Telecommunications Industry Solutions (ATIS) sponsors committee T1, which is an ANSI accredited standards organization with a broad mission to provide standards for the planning, design and operations of global end-to-end telecommunications and related information services. Specifically, technical sub-committee T1M1 provides standards, such as T1.246, for internetwork operations, administration, maintenance and provisioning. Once completed and agreed upon, these standards become ANSI standards. This standard uses an OSI protocol stack that includes Common Management Information Protocol (CMIP) for the application layer. A CARE record can contain a PIC order, customer information inquiry, or customer information.

ANSI standard T1.246 describes the standard for CARE records, including definition of objects and formatting of data. The present invention conforms to this standard. The invention is novel in its application of CMIP to exchange this data among carriers.

Using CMIP, customer information, such as a PIC order, is transmitted between carriers. This information conforms to the T1.246 standard. As an example of its use, a PIC order can be transmitted by an IEC to a LEC in real-time. A confirmation that the PIC order was successfully completed is returned to the IEC within seconds.

The present invention also enables an IEC to increase the frequency of CARE transmissions to a LEC, by eliminating much of the expenses incurred by previous methods. This presents another reduction in the time required to complete PIC orders.

In summary, the present invention provides a system and method for real-time exchange of customer information. This information can pertain to PIC change notifications (a.k.a. FYI's) sent by a LEC to an IEC, customer inquiries sent by an IEC to a LEC, and other applications, in addition to PIC order processing.

BRIEF DESCRIPTION OF THE FIGURES

The above-mentioned objects and advantages of the present invention will be more clearly understood when considered in conjunction with the accompanying drawings, in which:

FIG. 3 is a table that identifies the standardized protocols used by Quick PIC for each of seven layers of the OSI data communications model.

FIG. 7 is a table of abbreviations used in the description.

DETAILED DESCRIPTION OF THE INVENTION

Figure 1:
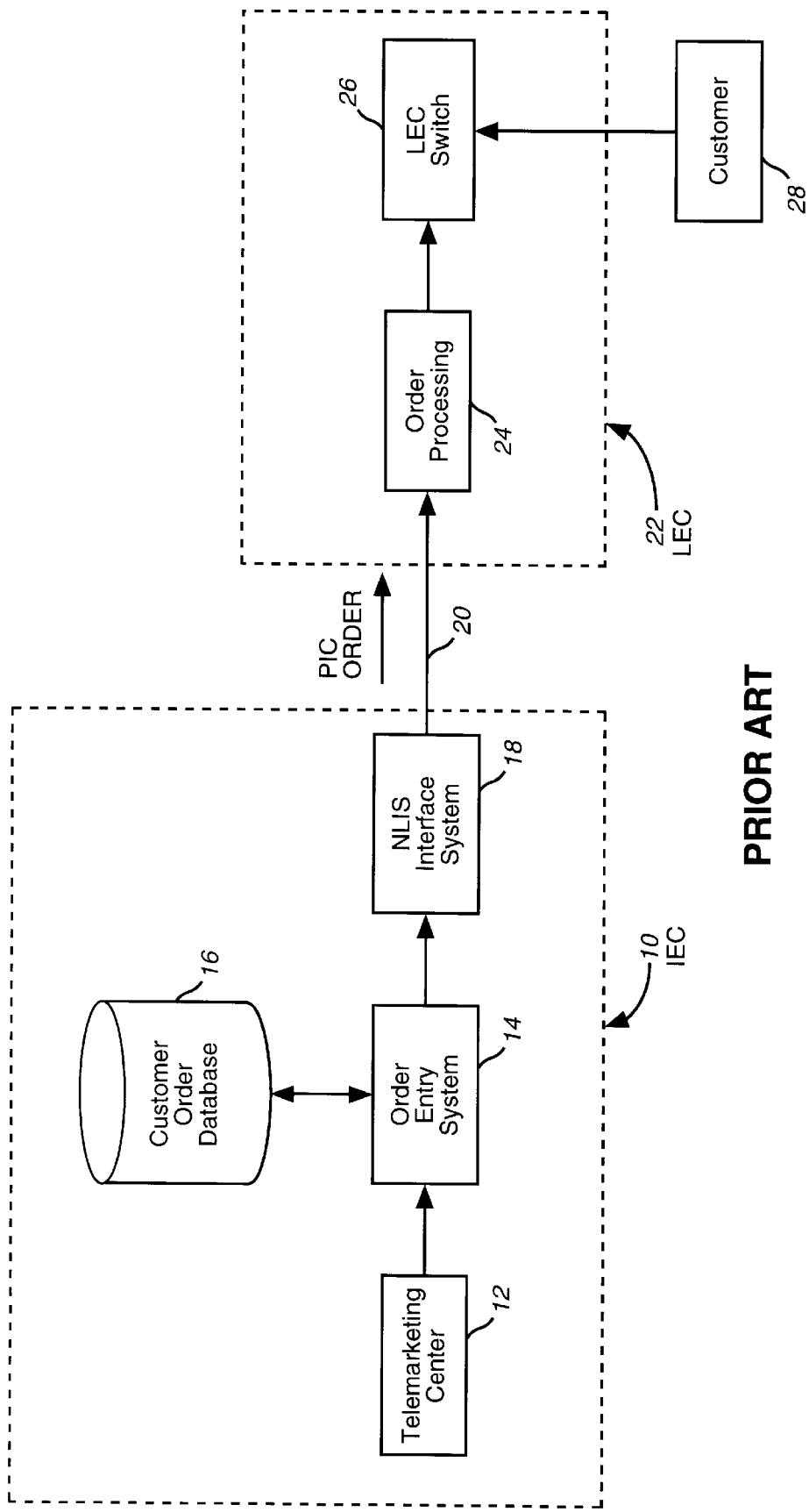
FIG. 1 is a block diagram illustrating the systems architecture of PIC order processing as described in prior art.

FIG. 1 illustrates a systems architecture for the PIC order process, as described in prior art. An IEC 10 may take a new customer's order for long distance service at a Telemarketing Center 12, for example. This order is fed into an Order Entry System 14 that communicates with a customer order database 16. A PIC order is generated and provided to a LEC Interface System (NLIS) 18. The LEC Interface System 18 sends the PIC order to the customer's LEC via a conventional communication network 20. The LEC 22 then processes the order at 24 and updates its switch 26 with the newly selected PIC of the customer 28.

In greater detail, an IEC signs up new customers for service via a number of methods. One method is via a Telemarketing Center 12. When a new customer selects IEC 10 for long distance service, an order for that customer is placed in an Order Entry System 14 and logged to a Customer Order Database 16. A PIC order is created and provided to a National LEC Interface System (NLIS) 18. The PIC order specifies the ANI of the customer, the Carrier Identification Code (CIC) of the newly selected IEC, service indicators for the customer's services, the customer's LEC, and other information as needed.

The NLIS formats the PIC order to a CARE record and determines the address of the LEC that is to receive it. It then sends the PIC order to the appropriate LEC. Several conventional methods are available. Network Data Mover (NDM) is a communications product for transmitting volumes of data between IBM mainframe computers, and is used because the NLIS and order processing systems 24 of LECs are commonly built on IBM mainframes. NDM uses telephone networks 20 to transmit PIC orders as batches of CARE records to a LEC's Order Processing system 24.

The NLIS can also write the PIC/CARE records to magnetic tape. The IEC then delivers the tape to the LEC. The LEC loads the tape onto their Order Processing system. Paper can also be used as a medium of transferring PIC/CARE records.

When the LEC processes the PIC order, it updates its switch 26 that serves the specified customer. Specifically, the CIC for the IEC that has been selected as the PIC is assigned to the port that supports the customer's access line. Thus, when the customer makes a dial 1 call, the LEC Switch automatically routes the call to the IEC's switch.

The IEC uses one of these methods (NDM, tape, paper) to transmit PIC/CARE records as a batch on a daily basis. Because of the expense and time required, a batch is sent once a day. This introduces a time delay of up to one day for the PIC order process.

When the LEC receives a daily batch of PIC/CARE records, it must load them to its Order Processing system, and process the orders. This introduces another delay of up to one day for the PIC order process. Thus, it can take up to two days for a PIC order from the NLIS to the LEC Switch. If the Order Entry System feed to the NLIS is a daily batch, this introduces up to a third day in the process.

Figure 2:
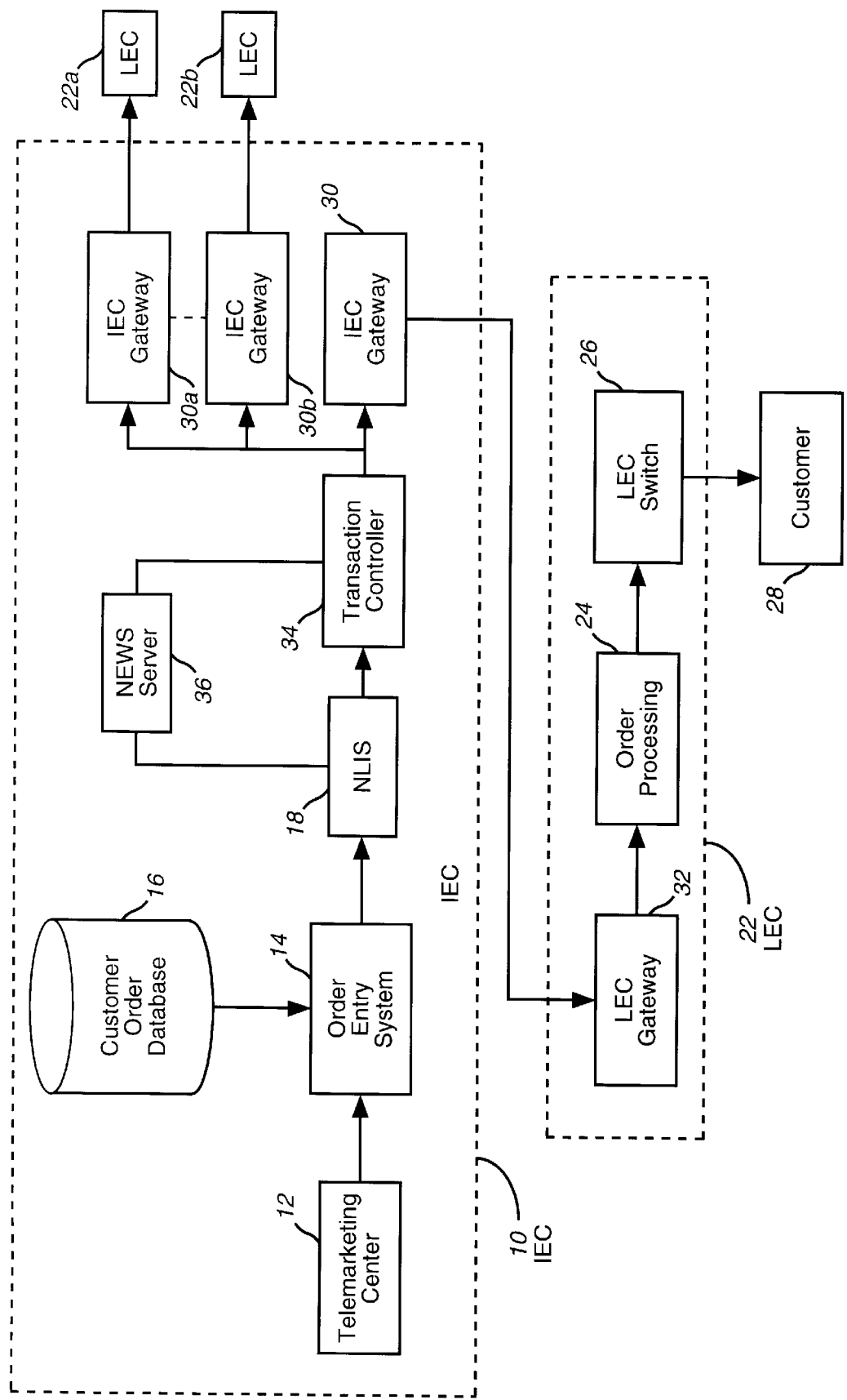
FIG. 2 is a block diagram illustrating the systems architecture of Quick PIC order processing, as provided by the present invention.

FIG. 2 is a block diagram illustrating the systems architecture of Quick PIC order processing, as provided by the present invention. Quick PIC replaces the batch processing and transmission of the previous method of PIC order processing, with real-time processing and interfaces.

Quick PIC reduces the three-day PIC order processing cycle to one that is completed in less than one minute. First, it introduces a real-time feed from the Order Entry System 14 to the NLIS 18. This removes the dependency on a daily batch feed from the process, and thus removes the first (up to) one day delay. In the preferred embodiment, a proprietary middleware messaging product of Applicant, MCI, known as Registry, is used for real-time communications between the Order Entry System 14 and the NLIS. Registry is described in copending patent application No. 08/560,550, filed on Nov. 17, 1995.

Briefly, Registry, is a system that resides on each application resource (both clients and servers) of a distributed computing platform. It is a communications agent that supports a suite of communications messaging products and network protocols. It serves as a logical layer of communications between applications and the transport mechanisms of the network. By doing this, Registry shields the application programmers from all of the underlying complexities of proprietary messaging and transport protocols.

Registry accepts application-specific messages from clients, encapsulates them into standard Registry-specific messages, and then translates them into the protocol necessary for whichever transport and messaging mechanisms that are to be used. At the other end, Registry takes the client-sent message and translates it from the transport protocol that was used to an application-specific message that is used by the server. Therefore, Registry provides enterprise-wide application connectivity across a broad array of operating systems, hardware platforms, messaging products, and network protocols. Another advantage of Registry that it eliminates the need for each application to have specific interfaces to the various messaging and transport protocols that are in use.

Quick PIC introduces a real-time interface between the IEC 10 and the LEC 22 that reduces the 1–2 day process of sending and completing a PIC order, to a process that completes in 10 seconds.

Quick PIC uses a midrange telecommunications gateway, identified as an IEC Gateway 30, 30a, 30b in this example, to provide standardized communications between the IEC 10 and LEC (22, 22a, 22b). In the preferred embodiment, one IEC Gateway per LEC is used to support scaleability and high volumes of data. The IEC Gateway provides the communications protocols specified in FIG. 3, in accordance with each layer of the OSI protocol model. It uses Common Management Information Protocol (CMIP) for the Application Layer.

At the LEC, a LEC Gateway 32 provides the same functionality as the IEC Gateway. Dedicated 256 kbps communications links are used between the IEC Gateway and the LEC Gateway. Multiple lines may be used for redundancy and scaleability.

Quick PIC also uses a Transaction Controller 34. This is a process that, in the preferred embodiment, is implemented on a midrange computer that is distinct from the computers used for the IEC Gateways. It is also possible to implement the Transaction Controller on a same midrange computer as an IEC Gateway.

The NLIS 18, which is implemented on a mainframe computer, receives the PIC order from the Order Entry System 14. It posts the order to a database internal of the NLIS for tracking. It then determines the LEC that is to receive it, and the method for transmitting the record to that LEC. The present invention not only supports the real-time interface to the LEC, but also the conventional methods of interface, including NDM, tape, and paper. It may be that only some LECs are capable of supporting the real-time interface provided by Quick PIC. Thus, NLIS determines what method (Quick PIC, NDM, tape, paper) of transmission is to be used, based on the LEC. NLIS then formats the PIC order into a CARE record. For CARE records that are to be transmitted to a LEC using Quick PIC, NLIS sends the CARE record to the Transaction Controller 34. NLIS is also responsible for tracking each PIC order and ensuring a confirmation is received back from the LEC.

The Transaction Controller 34 logs a transaction representing the processing of the PIC order. It then distributes the PIC/CARE record to the IEC Gateway (30, 30a, 30b) that interfaces with the appropriate LEC (22, 22a, 22b). The Transaction Controller can also perform analysis on the various transactions (PIC orders) for reporting purposes.

In the preferred embodiment, conventional TCP/IP is used for communications between the NLIS and the Transaction Controller, and between the Transaction Controller and the IEC Gateways. Other communications protocols and methods may be used. Middleware messaging products (such as MCI's Registry or IBM's MQ Series), X.25 networks, and even shared memory can be used.

The following discussion relates to communication between IEC Gateway 30 and LEC 22. The IEC Gateway uses CMIP to establish a session with the LEC Gateway 32. The IEC Gateway functions as a Manager, and the LEC Gateway functions as an Agent. This processing is shown and discussed in connection with FIG. 4.

The IEC gateway converts the PIC/CARE record to CMIP, and transmits it to the LEC Gateway 32 via a dedicated 256 kbps link. It then waits for a confirmation sent back from the LEC Gateway. This confirmation is sent after the LEC has processed the PIC order and updated its switch. It is sent in the same session as the original PIC/CARE record, and thus the manager/agent roles do not change.

The IEC Gateway sends a confirmation for each PIC order to the Transaction Controller 34. The Transaction Controller logs the confirmation as a transaction for analysis and reporting purposes, and sends it to the NLIS 18. The NLIS updates its internal database to indicate the PIC order has been completed, and passes confirmation on to the Order Entry System 14, so that the Customer Order Database 16 can be updated. The customer has now been converted to a new PIC, and the IEC's customer database reflects that.

The present invention also enables an IEC 10 to increase the frequency of CARE transmission to a LEC, by eliminating much of the expenses incurred by previous methods. For example, an IEC can only afford to deliver a batch of CARE records by magnetic tape once a day, but can perform the real-time transmission afforded by Quick PIC several times a day. In fact, CARE record transmission can now be performed on-demand.

Also shown in FIG. 2 as an additional aspect, an NLIS Enhanced Workstation (NEWS) Server 36 is connected to the NLIS 18 and the Transaction Controller 34. The NEWS Server provides system monitoring and control, reporting, and event notification through automated paging and e-mail notification processes. The Transaction Controller logs each transaction. It can also perform analysis on these transaction, such as daily volume measurements. Results of these analyses can be reported through the NEWS Server 36.

Also, certain transactions or thresholds can trigger automated messaging through the NEWS Server. For example, if a confirmation to a PIC order is not received, or if the operating system of the Transaction Controller or NLIS experiences a failure, the NEWS Server can automatically issue a page to a specified number to notify the appropriate personnel.

FIG. 3 is a table that identifies the standardized telecommunications industry protocols used by Quick PIC for each of seven layers of the OSI data communications model. The IEC Gateway provides communications with the LEC Gateway using these protocols.

Figure 4:
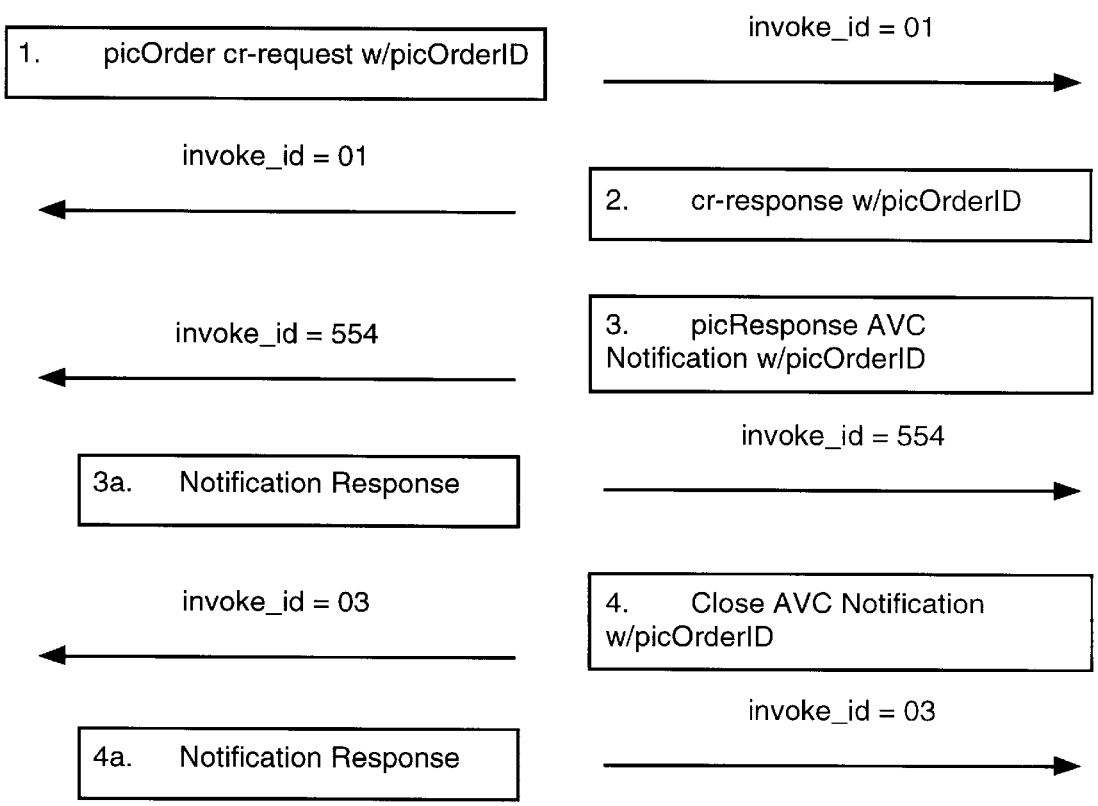
FIG. 4 illustrates the PIC order process, using standardized PIC/CARE record objects, between the Manager (IEC Gateway) and Agent (LEC Gateway) in assigning a PIC for a single Billing Telephone Number (BTN) that is associated with a single Working Telephone Number (WTN).

FIG. 4 illustrates the PIC order process, using standardized PIC/CARE record objects, between the Manager (IEC Gateway 30, 30a, 30b) and Agent (LEC Gateway 32) in assigning a PIC for a single Billing Telephone Number (BTN) that is associated with a single Working Telephone Number (WTN).

The Manager sends a PIC order for a BTN with a single WTN as a cr-request message to the Agent. A response to that PIC order is matched at the CMIP application layer using an invoke_id of the cr-request message. When the Agent has processed the PIC order (processed by the LEC's order processing systems and switches), it sends a picResponse Attribute Value Change Notification to the Manager. A response to that notification is matched using an invoke_id, and is sent to the Agent. The cycle is indicated in FIG. 4 by steps 1–4. The Connectivity Transactions (called messages) are (1,2) (3,3a), (4,4a). The Business Transactions are 1,3 for single BTN/WTN.

Figure 5:
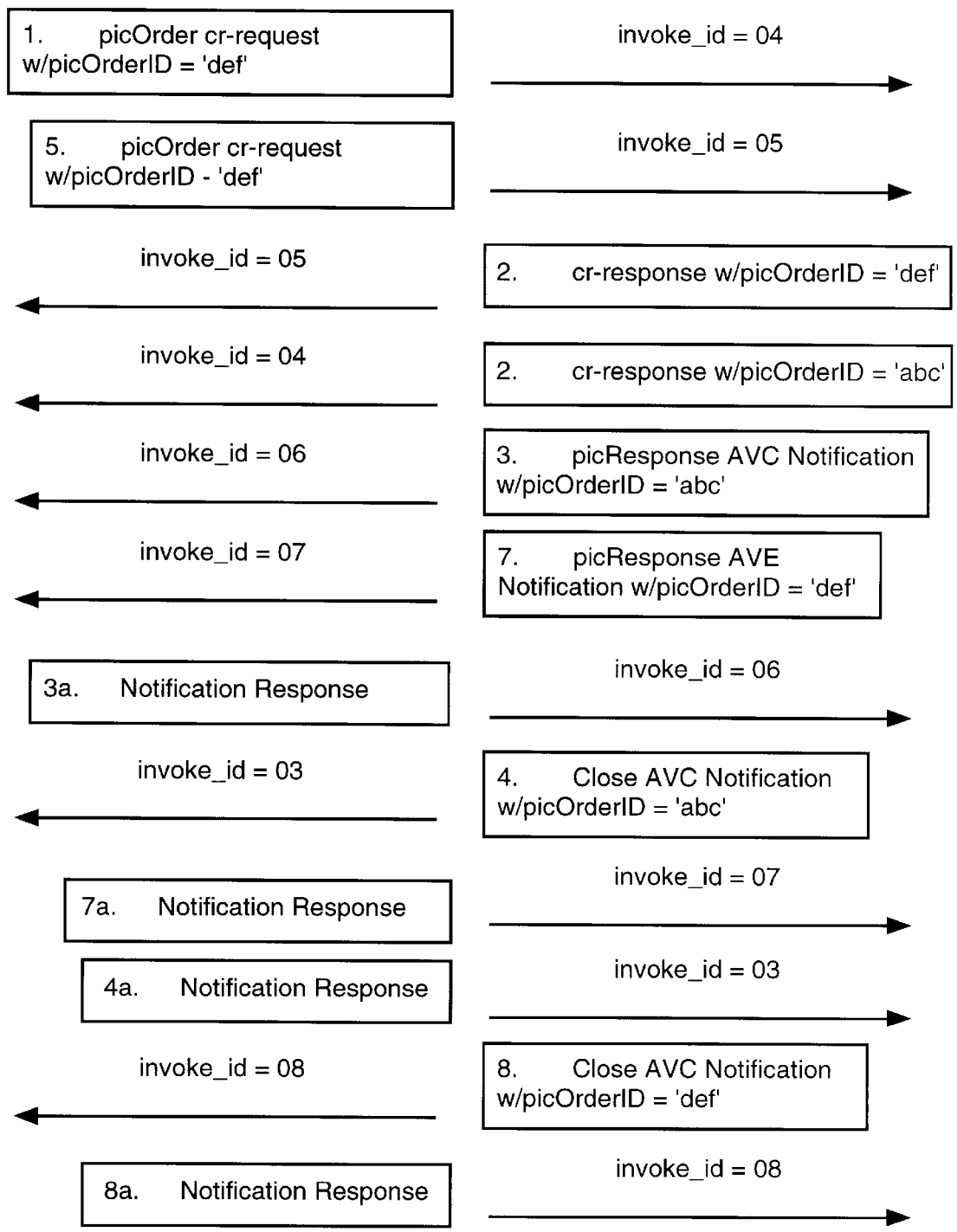
FIG. 5 illustrates the PIC order process, using standardized PIC/CARE record objects, between the Manager and Agent in assigning PICs for multiple telephone numbers.

FIG. 5 illustrates the PIC order process, using standardized PIC/CARE record objects, between the Manager and Agent in assigning PICs for multiple telephone numbers.

The Manager sends multiple PIC orders as cr-request messages, and the responses to those PIC orders, at the CMIP application level, are again matched using invoke_ids of the corresponding cr-request messages. Responses to the cr-request messages do not necessarily return in the same order as the cr-request messages were sent. They are matched using invoke_ids.

When a Manager sends a cr-request message for a PIC order to an Agent, the cr-response message sent by the Agent contains a Managed Object Instance (MOI) for the PIC order object that was created. The Manager will use the picOrderID contained within the MOI to match future picOrderResponse Notifications sent as the Agent processes the corresponding PIC order.

The cycle is indicated in FIG. 5 by steps 1–8. The Connectivity Transactions (called messages) are {(1,2) (3,3a), (4,4a)}, {(5,6), (7,7a), (8,8a)}. The Business Transactions are (1,3) for a single BTN/WTN ID ="abc"; (5,7) for a single BTN/WTD ID="def".

Figure 6:
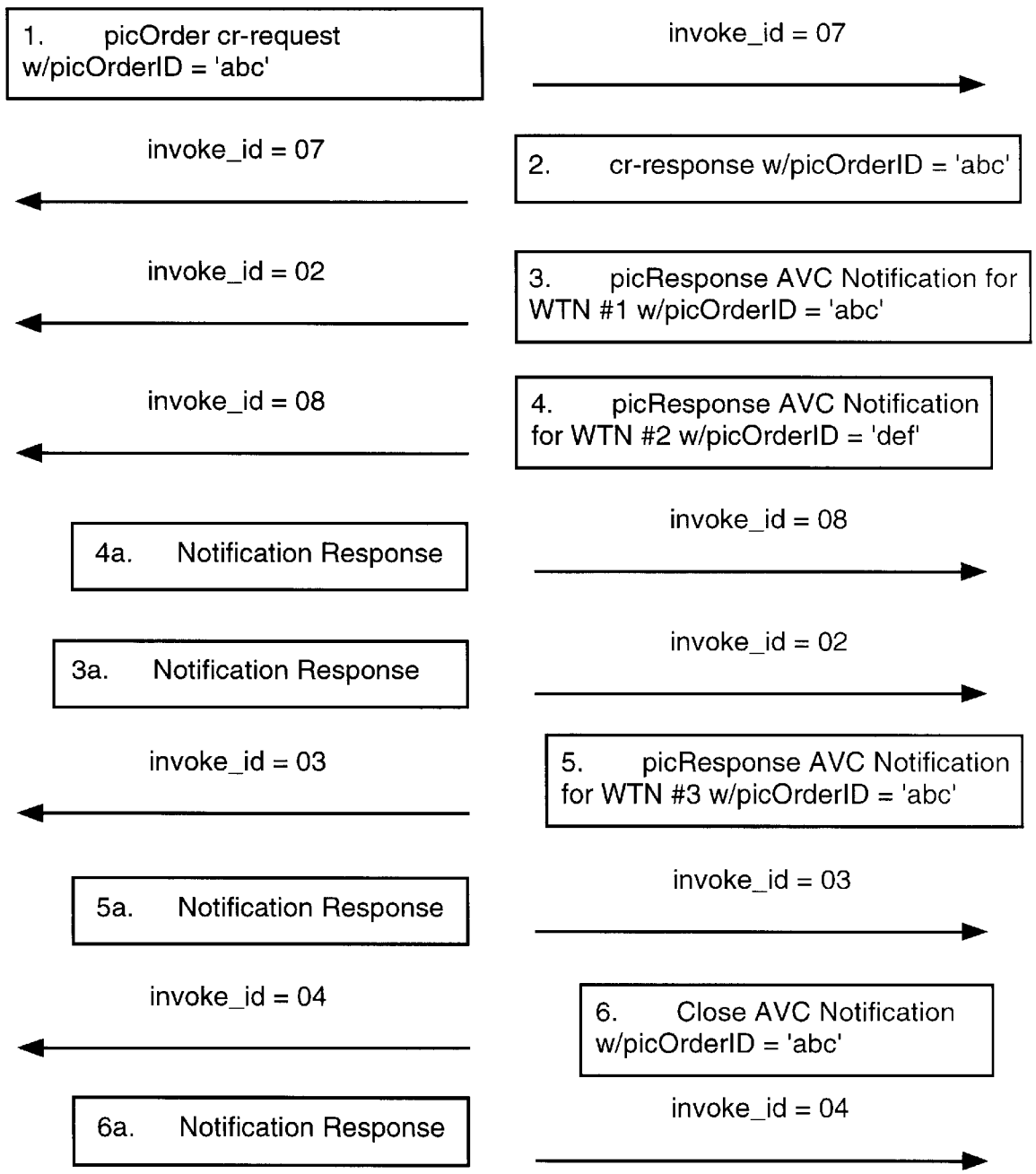
FIG. 6 illustrates the PIC order process, using standardized PIC/CARE record objects, between the Manager and Agent in assigning a PIC for a single Billing Telephone Number that is associated with multiple Working Telephone Numbers.

FIG. 6 illustrates the PIC order process, using standardized PIC/CARE record objects, between the Manager and Agent in assigning a PIC for a single Billing Telephone Number that is associated with multiple Working Telephone Numbers. In this example, a single BTN is associated with three WTNs. Three picOrder Response Notifications are received by the Manager, each containing an MOI with the picOrderID value the same as the picOrderID returned in the cr-response message. The Manager and Agent track responses to messages at the CMIP level using invoke_ids. The cycle is indicated in FIG. 6 by steps 1–6. Connectivity Transactions (called messages) are (1,2), (3,3a), (4,4a), (5,5a), (6,6a). Business Transactions are 1, 3, 4, 5 for a single BTN/Multiple WTNs.

The following relates to copending patent application 08/560,550 entitled "Registry Communications Middleware", filed on Nov. 17, 1995. That invention uses a telecommunications gateway to provide a real-time interface to an LEC for the exchange of trouble tickets related to equipment problems. It also uses CMIP as an application layer protocol, but uses a different application process.

Specifically, the related invention conforms to ANSI T1.227/.228 telecommunications standard that specifies definitions and formats of data for trouble reporting. It also uses a single gateway, which is sufficient due to the lower volumes of trouble ticket records that are exchanged between carriers. PIC orders are of much higher volumes.

In summary, the present invention allows new PIC orders to be processed within seconds, thus allowing long distance carrier customers, who are switching carriers, to almost immediately use their newly selected carrier for dial 1 calls. No other IEC has been able to implement this method.

The application that uses the present invention is known and publicized as Quick PIC. Quick PIC includes use of the IEC Gateway for CMIP communications, and the Transaction Controller, which represent the novelty of the present invention. Quick PIC also includes a real-time interface between the Order Entry System (MCI's OCIS) and NLIS. Other improvements made to PIC order processing to realize Quick PIC include converting NLIS from VSAM to DB2, and increasing the frequency of CARE transmissions to the LEC.

In addition to PIC order processing, the present invention can also used for "FYI" notices sent by a LEC to an IEC. An FYI notice informs the IEC that one of its customers has changed its PIC to another carrier. The present invention allows these notices to be sent to the IEC in real-time, so that the IEC can take immediate action, such as following up with the customer.

The present invention can also be used for customer inquiries, in which an IEC sends an inquiry to the LEC for customer information, such as billing address or selected services.

It should be understood that the invention is not limited to the exact details of construction shown and described herein for obvious modifications will occur to persons skilled in the art.

We claim:

1. A method for exchanging customer data between an inter-exchange telecommunications carrier (IEC) and a plurality of local exchange carriers (LECs) connected in parallel to the output of the IEC, the method comprising the steps:

generating customer data at the inter-exchange carrier (IEC);

detecting, from the data, which LEC is to be accessed;

formatting the data into a customer account record exchange (CARE) record;

posting the data to a database during transaction control for tracking the data;

determining, from the nature of the LEC to be accessed, the method for transmitting the record thereto;

distributing the CARE record to one of a plurality of gateways at the IEC;

interfacing the CARE record from the gateway to a respectively connected LEC; and receiving a confirmation from the LEC indicating acceptance of the CARE record by the LEC.

2. The method set forth in claim 1 wherein the interfacing occurs in substantially real-time.

3. The method set forth in claim 1 wherein the step of determining the type of transmission which is to occur between the IEC and LEC results in a determination from the group consisting of: real time record transmission; or batch transmission of Network Data Mover (NDM), tape, or paper.

4. The method set forth in claim 1 together with the steps of performing an analysis on the records transmitted; and compiling preselected reports therefrom.

5. A method for exchanging customer data in the nature of a customer selected Preferred Inter-Exchange Carrier (PIC), the exchange occurring between an inter-exchange telecommunications carrier (IEC) and a plurality of local exchange carriers (LECs) connected in parallel to the output of the IEC, the method comprising the steps:

generating customer PIC data at the inter-exchange carrier (IEC);

detecting, from the PIC data, which LEC is to be accessed;

formatting the PIC data into a customer account record exchange (CARE) record;

posting the PIC data to a PIC database during transaction control for tracking the PIC data;

determining, from the nature of the LEC to be accessed, that real time transmission of the record is appropriate;

distributing the CARE record to one of a plurality of gateways at the IEC;

interfacing the CARE record from the gateway to a respectively connected LEC in real time; and receiving a confirmation from the LEC indicating acceptance of the CARE record by the LEC.

6. The method set forth in claim 5 together with the steps of performing an analysis on the records transmitted, and compiling preselected reports therefrom.

7. The method set forth in claim 5 wherein the receipt of confirmation occurs subsequent to the processing by the LEC of the PIC data that corresponds to a PIC order, followed by the corresponding updating of an LEC switch for connection to a selected IEC.

8. The method set forth in claim 5 wherein the interfacing occurs between the IEC gateway and a gateway of a respectively connected LEC.

9. The method set forth in claim 8 wherein the IEC Gateway functions as a Manager, and the LEC Gateway functions as an Agent, receipt of confirmation from the LEC being sent in the same session as an original CARE record so that the manager/agent roles remains unchanged.

10. The method set forth in claim 8 wherein the IEC Gateway establishes a session with the LEC Gateway employing an OSI protocol stack that includes Common Management Information Protocol (CMIP).

11. The method set forth in claim 10 wherein the IEC gateway converts the CARE record, relating to PIC data, to CMIP; and transmits it to the LEC Gateway via a dedicated link.

12. The method set forth in claim 11 wherein confirmation from the LEC of PIC data is logged for analysis and reporting;

and further wherein the confirmation is interfaced with a second database for updating the second database with an indication of completion of a customer order that corresponds to a new PIC for the customer.

13. The method set forth in claim 12 together with the step of detecting a failure of receiving confirmation of a PIC order; and generating a corresponding alert.

14. A system for exchanging customer data in the nature of a customer selected Preferred Inter-Exchange Carrier (PIC), the exchange occurring between an inter-exchange telecommunications carrier (IEC) and a plurality of local exchange carriers (LECs) connected in parallel to the output of the IEC, the IEC comprising:

means for entering customer order PIC data;

first server means connected to the entering means for—
   a) detecting, from the PIC data, which LEC is to be accessed;
   b) formatting the PIC data into a customer account record exchange (CARE) record;
   c) tracking the PIC data; and
   d) determining, from the nature of the LEC to be accessed, that real time transmission of the record is appropriate;

transaction control means connected to the server means for logging and controlling each transaction;

a plurality of gateway means connected to the transaction control means for selectively receiving CARE records distributed to the gateway means by the transaction control means;

means for interfacing a CARE record from the selected gateway means to a respectively connected LEC in real time;

the transaction control means receiving a confirmation from a correspondingly connected LEC indicating acceptance of the CARE record by the LEC.

15. The method set forth in claim 14 wherein the confirmation is logged by the transaction control means for performing analyses of PIC transactions.

16. The method set forth in claim 15 wherein the confirmation logged by the transaction control means is sent to the entering means; and customer database means connected to the entering means for receiving a confirmation and updating customer data.

17. The system set forth in claim 14 together with a second server for detecting a failure of receiving confirmation of a customer order by the LEC and generating an alert.

18. The system set forth in claim 15 together with:

gateway means located at the LEC for receiving customer order records from the IEC gateway means;

means located at the LEC and connected to the IEC gateway means for processing orders from the received records; and a communication switch located at the LEC, the switch storing a new PIC in response to the customer order, as indicated by the confirmation.

* * * * *